United States Patent
Byers et al.

[11] Patent Number: 4,815,836
[45] Date of Patent: Mar. 28, 1989

[54] ADJUSTABLE SUPPORT MECHANISM FOR VEHICLE SIDE VIEW MIRROR

[76] Inventors: Gary L. Byers; Timothy W. Byers, both of 6065 Hwy. 93 North, Whitefish, Mont. 59937

[21] Appl. No.: 128,056
[22] Filed: Dec. 3, 1987
[51] Int. Cl.[4] .......................... B60R 1/08; G02B 7/18; G02B 5/08
[52] U.S. Cl. .................................. 350/604; 350/639; 248/480; 248/298
[58] Field of Search ............... 350/604, 639, 632, 631; 248/480, 476, 475, 298

[56] References Cited

U.S. PATENT DOCUMENTS

| | | | |
|---|---|---|---|
| 4,451,021 | 5/1984 | Merriss | 248/480 |
| 4,711,538 | 12/1987 | Ohs et al. | 350/639 |
| 4,730,913 | 3/1988 | Boothe | 350/604 |
| 4,753,410 | 6/1988 | Dyer | 248/480 |

Primary Examiner—Jon W. Henry
Attorney, Agent, or Firm—George M. Cole

[57] ABSTRACT

An adjustable side view mirror assembly (10) which includes a conventional support mounting (14) supporting neck (12) and mirror (M). After the neck (12) is cut a desired distance above mount (14) an adapter bar (20) is connected to the stub (23) left on mount (14). A slidable mirror support block (40) has a slot (60) through which is received bar (20) and which has lock means (66) for securing and releasing the block for slidable movement with respect to the bar. On the top of the block means (40) is a support cavity (54) to receive the neck (12) for supporting the mirror (M). Securement means (56,58) are provided to lock neck (12) in cavity (54).

4 Claims, 2 Drawing Sheets

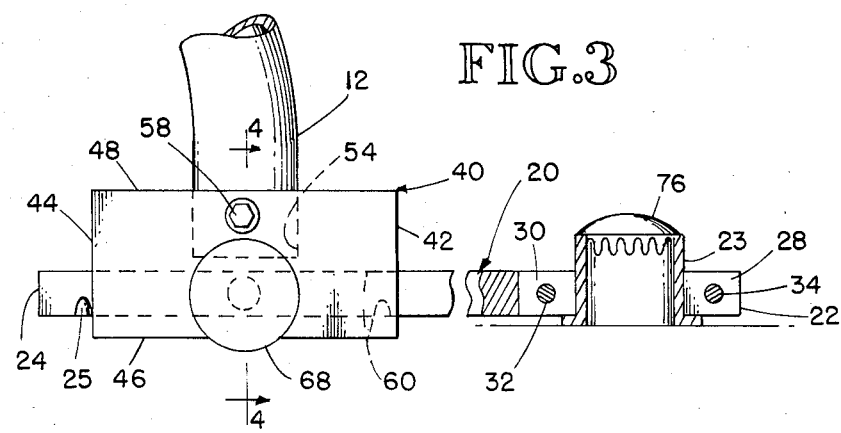
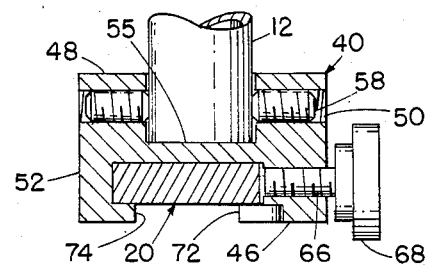
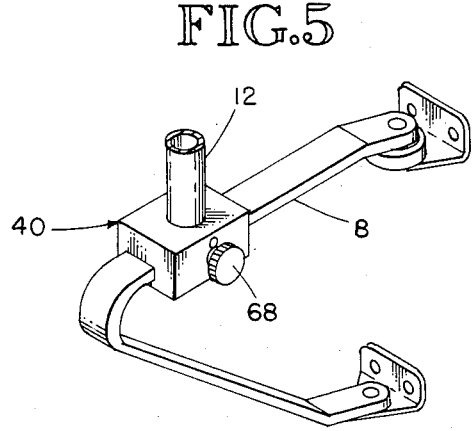

ADJUSTABLE SUPPORT MECHANISM FOR VEHICLE SIDE VIEW MIRROR

DESCRIPTION

1. Technical Field

The invention relates generally to the field of side mounted, outside mirrors for cars and trucks, and more particularly to a side mounted mirror support which is movable horizontally between an extended and a retracted position.

2. Background Art

As operators are aware, vehicles used for carrying loads and towing, whether they be automobiles, pick-up trucks, vans or the like, frequently have a conventional side view mirror which does not enable the driver to see to the rear. This is particularly so where, for instance, an extra wide tow or load is involved such as a boat trailer, trailer home, camping trailer or high and wide load of whatever nature. Campers on the beds of pick-up trucks are another example. These loads are most often not only wide but long and the standard side mounted mirror simply does not permit an adequate line of vision to the rear of the load or tow. In addition there is the problem of blurring caused by vibration of the mirror on its mounting.

One solution with which many drivers are familiar is the extended mirror mounting frame which holds the mirror far enough away from the side of the vehicle so that the driver can observe to the rear of his load or tow. Typically, the extra wide or extended mirror mounts are a three point support frame structure attached to the outside of each front door panel. Unlike many if not most conventional mirror mounts which are rotatable or can fold back, the three point support frame is fixed. If the rotatable mount is accidentally struck, it will collapse or fold back without damage to itself or to the door panel. On the other hand, if a rigid three point extended mirror frame is hit substantial damage can be done to the door panel and/or to the mounting frame itself.

One solution is to change back to the conventional mirror mount when the vehicle is not being used to carry a load or to tow. However, changing mirror mounts is time consuming, tedious and frustrating.

The broad concept of a laterally adjustable mirror, from a first position near the door window to an outer or extended second position to establish a line of vision rearwardly of a load or tow, is old. In U.S. Pat. No. 4,165,156 to O'Connell a fold back mounting frame bracket is used together with a pivot arm for the mirror. The structure allows the mirror to be at a conventional distance from the driver's window. It also allows the driver to pivot the mirror to an outer position thus enabling him or her to see behind a load or tow.

Another structure for horizontal outward adjustment of a vehicle mirror is found in U.S. Pat. No. 4,111,532 which is a temporary or substitute mirror mounted on the existing side view mirror. Structural principles of such a device are significantly different from the device of this invention.

In U.S. Pat. No. 4,558,930 to Deedreek an outwardly extendible mirror is provided by a motor driven rack and pinion. The mirror itself is also pivotable with an electric motor driven set of gears. Again, the structure is unrelated in principle or design to the instant device.

U.S. Pat. No. 4,247,173 to Vitalone shows another structurally unrelated system for extending and retracting an outside rear view mirror. British Patent Specification No. 499,802 shows a very complicated and prohibitively expensive structure for extending and retracting a mirror but it is not pert to the invention herein. Finally U.S. Pat. No. 4,451,021 to Merriss shows a simple slotted slide bar which is secured by a bolt to the upper part of the door panel bracket. Again, however, it is not material to the invention herein.

SUMMARY OF THE INVENTION

The invention comprises a structure which utilizes the existing door panel mirror mounting frame or support. One type of door panel mounted support includes a curved or arcuate neck part which neck is cut as by hacksaw a predetermined distance above the top of the support. The upwardly extending stub is provided with an adapter arm in which is mounted a slidable mirror mounting block. The slidably adjustable block has a slot therein by which it is received on the adapter arm. A cavity on the upper surface of the block receives the mirror support neck by being inserted in the cavity and then tightened in position. Alternatively the block can be made in two parts and installed on the upper horizontal bar portion of an existing bracket.

Accordingly, it is among the many features of the invention to provide a horizontally adjustable and repositionable exterior side view mirror support structure which is uniquely simple, inexpensive, rugged and durable. The mirror support device allows the vehicle owner to utilize the existing mounting means such that the mirror itself is disconnected from the original support and replaced on the support structure of this invention. No special tools are required to install the device and it is not necessary to drill any holes. The block can be mounted on an adapter arm or on the upper horizontal portion of a support frame. The invention is designed to be tamper proof and retains the advantage of using the original mirror support structure mounted on the door panel.

BRIEF DESCRIPTION OF THE DRAWINGS

FIG. 3 is a view in perspective showing a two part block of the invention installed on the upper part of a standard support bracket, FIG. 4 is an elevational view showing additional details of the view of FIG. 2, and FIG. 5 is a cross section view of the mounting block of the invention showing additional details thereof.

BEST MODE FOR CARRYING OUT THE INVENTION

Figure 1:
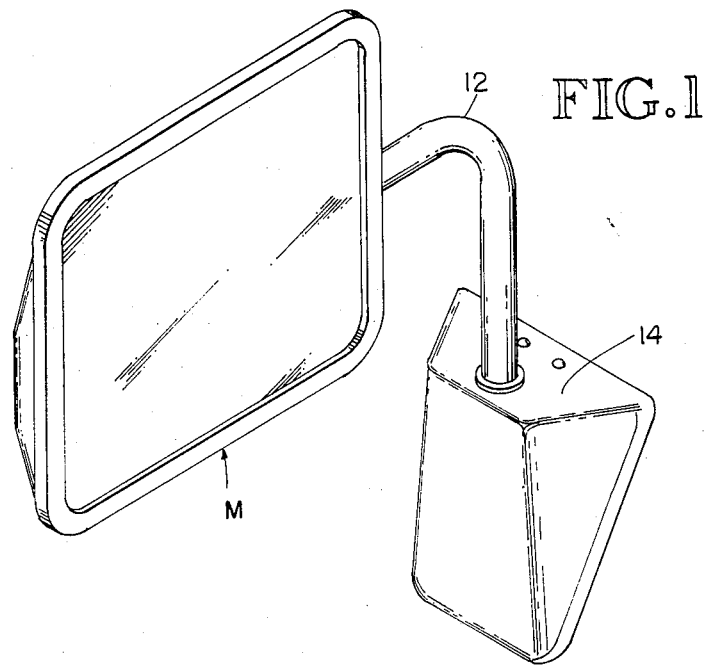
FIG. 1 is a view in perspective showing a standard type of mounting structure for an exterior mirror.

Referring now to the drawings it will be seen that FIG. 1 represents a standard type of side view mirror mount for a vehicle such as a Chevrolet pick-up truck or van. Mirror M is connected by curved tubular support neck member 12 to the mounting frame 14 attached to the door panel.

Figure 2:
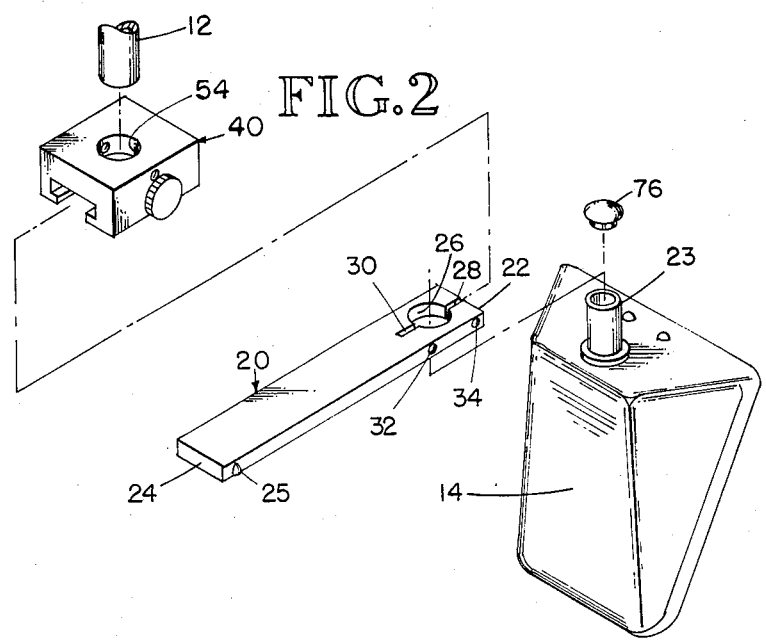
FIG. 2 is a view in perspective of the mirror of FIG. 1 removed by cutting through the curved neck and installing an adapter arm on the stub.

To install the invention of this application the neck support 12 is cut a predetermined distance above the level as by hacksaw or the like so that a stub 23 is left on mount 14. An adapter support bar, generally designated by the number 20, and as can best be seen in FIGS. 2 and 3, is an elongated rectangular bar approximately ¼ inch thick by approximately 6 inches in length and about 1 inch in width. Bar 20 has inner end 22 and outer end 24 and near inner end 22 is provided with an opening 26 which is received on stub 23. Bar 20 has adjustment slots 28 and 30 on each side of the opening 26 and recessed lock screws 32 and 34 extend from one side edge of the bar through the slots and to the other side of the slots in order to securely clamp the bar to stub 23.

An adjustable mirror mounting block, generally designated by the number 40, is generally rectangular having inner and outer ends 42 and 44 respectively, top surface 48, bottom surface 46, and front and rear sides 52 and 50 respectively. Top surface 48 is generally planar and includes opening 54 therein which extends downwardly to bottom cavity surface 55 to receive the arcuate or curved neck support member 12. Recessed lock screws 56 and 58 are received in threaded holes from each side surface 50 and 52 to hold neck 12 rigidly in position in the opening 54. Below the opening 54 in the body of block 40 is a slot 60 to receive adapter bar 20. It will be appreciated that an adjustment screw 66 extends into the block from the rear side edge 50 of the block to engage the bar. The adjustment screw 66 has knurled finger knob 68 so that the screw can be released easily and the block 40 moved to its desired location on the bar. At the location at which screw 66 engages the bar there will be provided a cavity area 70 so that the inner end of screw 66 can be backed off bar 20. Stop means, not shown, are provided at the inner end of screw 66 so that it cannot be removed from its threaded hole. Thus, the need for the cavity area. It will be noted that the bottom of the block shows spaced apart front and rear ledges 72 and 74 as defining the bottom of slot 60. In this way a gap exists between the ledges 72 and 74 and facilitates the formation of the central cavity 70 during manufacture of the block. It is to be understood that stop means 25 will also be provided on or near the outer end 24 of bar 20 so that the block will not slide off the bar accidentally or because of vandal tampering. FIG. 4 shows that a convex metal disc 76 will snap into the stub 23 to cover the opening left when neck 12 is cut.

FIG. 3 shows a side view mirror mounting bracket commonly used on some pick-ups and vans such as those made by the Ford Motor Company. In this case the block 20 would be made in two pieces joined generally vertically through the center from inner to outer end since the block would have to be mounted on the already installed bracket 80. Thus, the block would be made of two parts divisible along a plane extending longitudinally of said support bar means and such that the two parts together form slot 60 and cavity 54. Recessed retainer bolts would hold the two halves together to function as above described. In this type of use there would be no need for the adapter bar 20 and the cavity 54 would be adapted in size to accommodate the style mirror support neck 12 shown in FIG. 3.

We claim:

1. In a side mounted rear view mirror assembly for vehicles including a mirror and mirror neck support member and further including generally horizontally disposed bar support means, the improvements, comprising:
    (a) a generally rectangular mirror support block means slidably mounted on said support bar means and having first inner end and second outer end surfaces, and further having a top surface a predetermined distance above a bottom surface and further including front facing and rear facing side surfaces, said mirror support block means including slot means extending from said first inner to said second outer end and located generally near said bottom surface, said slot means including opposing spaced apart ledge members forming the bottom of said slot means and being adapted to receive said support bar means, said top surface including opening means therein extending downwardly into the body of said block means to define a neck support cavity having a cavity bottom surface spaced above said slot means, and
    (b) adjustment lock means in said block means for releasably securing said block means to said support bar means at a desired position thereon and further including securement means above said slot means adapted to hold and secure a mirror neck support member in said neck support cavity.

2. The side mounted rear view mirror assembly according to claim 1 and wherein said adjustment lock means is a threaded screw member with finger gripping means thereon for quickly tightening and releasing said screw member with respect to said support bar means.

3. The side mounted rear view mirror assembly according to claim 1 and wherein said support bar means has stop means thereon to prevent said support block means from being disengaged from said support bar means.

4. The side mounted rear view mirror assembly according to claim 1 and wherein said block means is made in two parts divisible along a plane extending generally vertically through said block means from said first inner to said second outer end and including means for connecting and holding said parts securely together.

* * * * *